United States Patent
Cui et al.

(10) Patent No.: US 9,648,564 B1
(45) Date of Patent: May 9, 2017

(54) WAKE-UP MANAGEMENT FOR MOBILE DEVICES

(71) Applicant: AMAZON TECHNOLOGIES, INC., Reno, NV (US)

(72) Inventors: Wentian Cui, Sunnyvale, CA (US); Jin Guo, Cupertino, CA (US); King Shaw, Saratoga, CA (US)

(73) Assignee: Amazon Technologies, Inc., Reno, NV (US)

( * ) Notice: Subject to any disclaimer, the term of this patent is extended or adjusted under 35 U.S.C. 154(b) by 69 days.

(21) Appl. No.: 14/226,662

(22) Filed: Mar. 26, 2014

(51) Int. Cl.
*H04B 3/54* (2006.01)
*H04W 52/02* (2009.01)

(52) U.S. Cl.
CPC .............................. *H04W 52/0222* (2013.01)

(58) Field of Classification Search
CPC .......................... H04W 52/0216; H04W 84/12
USPC .......................................... 370/311, 252, 254
See application file for complete search history.

(56) References Cited

U.S. PATENT DOCUMENTS

| | | | | |
|---|---|---|---|---|
| 2005/0213524 A1* | 9/2005 | Doragh | ................. | H04W 84/12 370/311 |
| 2006/0233182 A1* | 10/2006 | Appanna | ................. | H04L 45/04 370/401 |
| 2006/0242300 A1* | 10/2006 | Yumoto | ............ | H04L 29/06027 709/226 |
| 2010/0091643 A1* | 4/2010 | Tu | ......................... | H04W 48/16 370/216 |
| 2010/0165897 A1* | 7/2010 | Sood | ...................... | H04L 49/90 370/311 |

* cited by examiner

*Primary Examiner* — Jamal Javaid
(74) *Attorney, Agent, or Firm* — Lowenstein Sandler LLP

(57) ABSTRACT

A processing device identifies a plurality of wake-ups that are requested by one or more applications and applies a wake-up restriction policy to the plurality of wake-ups. Applying the wake-up restriction policy to a wake-up of the plurality of wake-ups comprises determining whether the wake-up conforms to the wake-up restriction policy. Responsive to determining that the wake-up conforms to the wake-up restriction policy, the processing device permits the wake-up to activate at least one of the processing device or an additional processing device. Responsive to determining that the alarm wake-up will violate the wake-up restriction policy, the processing device prevents the wake-up from later activating at least one of the processing device or the additional processing device.

17 Claims, 10 Drawing Sheets

| UNRESTRICTED ALARM WAKE-UP SCHEDULE 405 ||
|---|---|
| APPLICATION | TIME |
| GAME | 1:00 PM |
| EMAIL | 1:02 PM |
| SOCIAL NETWORK | 1:05 PM |
| SOCIAL NETWORK | 1:15 PM |
| NEWS | 1:16 PM |
| SOCIAL NETWORK | 1:20 PM |
| EMAIL | 1:22 PM |
| SOCIAL NETWORK | 1:25 PM |
| SOCIAL NETWORK | 1:30 PM |
| SOCIAL NETWORK | 1:35 PM |
| SOCIAL NETWORK | 1:40 PM |
| EMAIL | 1:42 PM |

FIG. 4

| RESTRICTED ALARM WAKE-UP SCHEDULE 505 ||
|---|---|
| APPLICATION | TIME |
| GAME | 1:00 PM |
| EMAIL | 1:02 PM |
| SOCIAL NETWORK | 1:05 PM |
| ~~SOCIAL NETWORK~~ | ~~1:15 PM~~ |
| NEWS | 1:16 PM |
| ~~SOCIAL NETWORK~~ | ~~1:20 PM~~ |
| ~~EMAIL~~ | ~~1:22 PM~~ |
| ~~SOCIAL NETWORK~~ | ~~1:25 PM~~ |
| ~~SOCIAL NETWORK~~ | ~~1:30 PM~~ |
| SOCIAL NETWORK | 1:35 PM |
| ~~SOCIAL NETWORK~~ | ~~1:40 PM~~ |
| EMAIL | 1:42 PM |

FIG. 5

| RESTRICTED ALARM WAKE-UP SCHEDULE 605 ||
|---|---|
| APPLICATION | TIME |
| GAME | 1:00 PM |
| EMAIL | 1:10 PM |
| SOCIAL NETWORK | 1:20 PM |
| NEWS | 1:30 PM |
| EMAIL | 1:40 PM |
| SOCIAL NETWORK | 1:50 PM |

FIG. 6

| RESTRICTED CONNECTION DATA STRUCTURE (BLACKLIST) 705 ||
|---|---|
| RESTRICTED SOURCE | PORT |
| SOCIAL NETWORK SERVER | 1024 |
| EMAIL SERVER | 1030 |
| NEWS SERVER | 1034 |
| GAME SERVER | 1050 |

FIG. 7

WAKE-UP MANAGEMENT FOR MOBILE DEVICES

BACKGROUND

Battery life is an important issue for mobile devices. One factor that contributes to reduced battery life is the activities of applications. For example, some applications may periodically wake up a mobile device (place one or more components such as a processor of the mobile device into an active state) to perform potentially inconsequential operations. Each wake up instance of the mobile device drains the battery, thus reducing the overall battery life of the mobile device.

BRIEF DESCRIPTION OF THE DRAWINGS

The embodiments described herein will be understood more fully from the detailed description given below and from the accompanying drawings, which, however, should not be taken to limit the application to the specific embodiments, but are for explanation and understanding only.

FIG. 4 illustrates an example unrestricted alarm wake-up schedule.

FIG. 5 illustrates an example restricted alarm wake-up schedule.

FIG. 6 illustrates another example restricted alarm wake-up schedule.

FIG. 7 illustrates an example restricted connection data structure for a network wake-up filter

DETAILED DESCRIPTION

Mobile devices have batteries with a finite amount of available power. Certain components of mobile devices and certain activities of the mobile devices consume increased amounts of power, thus reducing battery life. One component that absorbs a large amount of power relative to other components of mobile devices is a processing device. Embodiments described herein provide a wake-up manager that places restrictions on what applications are allowed to wake-up or activate a processing device as well as when and how those applications are allowed to wake-up or activate the processing device. By minimizing the wake-ups of the processing device by non-essential applications and/or for non-essential purposes, battery life of a mobile device may be improved without causing a noticeable effect to a user.

In one embodiment, a wake-up manager of a mobile device gathers statistics about how often and under what circumstances different applications running on the mobile device wake-up or activate a processing device of the mobile device. The wake-up manager determines from the statistics which of the applications are causing the most wake-ups and/or most power drain on the mobile device. The wake-up manager may then impose wake-up restriction policies on one or more of the identified applications to prolong battery life. Examples of wake-up restrictions that may be applied include network wake-up restrictions that reduce or eliminate network wake-ups associated with specified applications, alarm wake-up restrictions that reduce or eliminate alarm wake-ups associated with specified applications, and wake lock restrictions that reduce or eliminate an ability of specified applications to use wake locks. Note that embodiments are described with reference to device wake-ups that wake-up a device. As defined herein, waking up a device is synonymous to activating the device, and may include transitioning the device out of a low power or suspended state as well as powering on the device.

Figure 1:
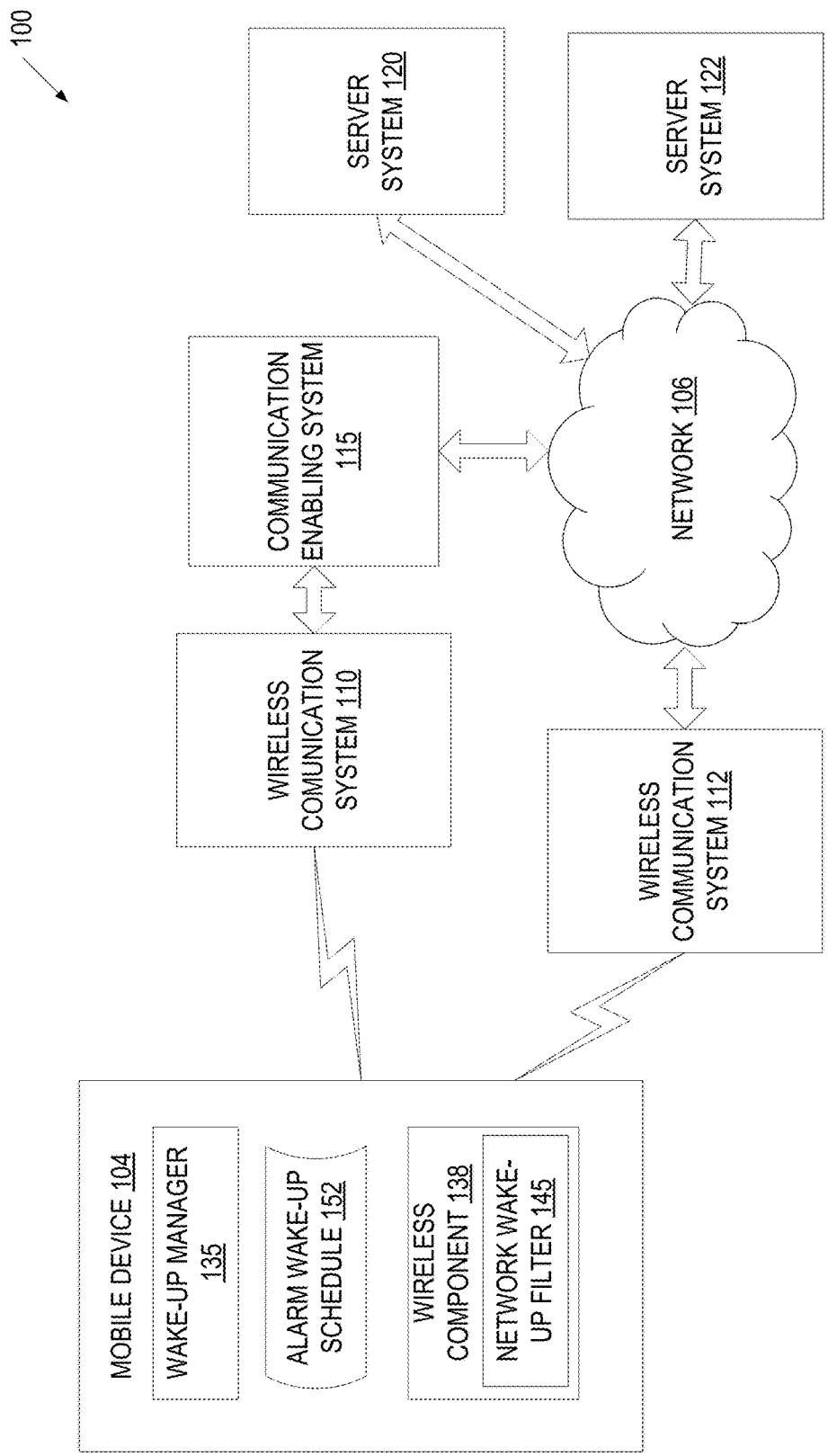
FIG. 1 is a block diagram of an example network architecture including a mobile device with a wake-up manager, in accordance with one embodiment.

FIG. 1 is a block diagram of an exemplary network architecture 100 in which embodiments described herein may operate. The network architecture 100 may include multiple server systems 120, 122 and a mobile device 104 capable of communicating with one or both of the server systems 120, 122 via a network 106. Network 106 may be a public network (e.g., the Internet), a private network (e.g., a local area network (LAN), wide area network (WAN), intranet, etc.), or combination thereof.

The mobile device 104 may include any type of mobile computing device that has a finite power source (e.g., that is powered by a battery). Examples of mobile devices 104 include electronic book readers, portable digital assistants, mobile phones, laptop computers, portable media players, tablet computers, cameras, video cameras, netbooks, notebooks, portable gaming consoles, portable media players (e.g., portable music players, portable video players, etc.), and the like.

The mobile device 104 may be configured with functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The mobile device 104 may also be capable of receiving and executing applications that may perform various functions. Applications may be developed by an entity affiliated with the mobile device (e.g., a manufacturer of the mobile device 104) and/or by third parties. For example, applications provided by social network services, game developers, news providers, and so forth may be installed on the mobile device.

Each of the applications that are installed on the mobile device 104 may use application programming interfaces (APIs) provided by the mobile device for waking up the mobile device. The term waking-up a mobile device as used herein means causing a component of the mobile device to transition from a low powered state (e.g., a suspended state) to a higher powered state. Various embodiments are discussed herein with reference to applying wake-up restriction policies that restrict waking-up a processing device of the mobile device. However, it should be understood that embodiments may also apply wake-up restriction policies that restrict the waking-up of other components, such as a radio of the mobile device, a screen of the mobile device, and so forth. Accordingly, it should be understood that any discussion of restricting wake-ups of processing devices also apply to restricting wake-ups of other mobile device components.

The mobile device includes a wireless component 138 that sends and receives information to wireless communication systems 110, 112. The wireless component 138 may be a wireless network interface controller (WNIC) or a wireless modem. Examples of WNICs include a Wi-Fi® network interface controller (NIC), a Bluetooth® NIC, and a Zigbee® NIC. Examples of wireless modems include second generation of mobile communications technology (2G) wireless modems, third generation of mobile communications technology (3G) wireless modems and fourth generation of mobile communications technology (4G) wireless modems, as well as multi-mode wireless modems that can communicate using some or all of 2G, 3G and/or 4G telecommunications protocols. In one embodiment, the wireless component 138 and the processing device of the mobile device 104 are two logics of a single integrated circuit. Alternatively, the wireless component 138 and the processing device may be discreet devices.

The server system 120 and the mobile device 104 deliver and/or receive media items, applications, upgrades, and/or other information via the network 106. For example, the mobile device 104 may download or receive data from the server system 120. The server system 120 also receives various requests, instructions and other data from the mobile device 104 via the network 106. The server system 120 may include one or more machines (e.g., one or more server computer systems, routers, gateways, etc.) that have processing and storage capabilities to provide the above functionality.

Communication between the server system 120 and the mobile device 104 may be enabled via any communication infrastructure. One example of such an infrastructure includes a combination of a wide area network (WAN) and wireless infrastructure, which allows a user to use the mobile device 104 to purchase items and consume items without being tethered to the server system 120 via hardwired links. The wireless infrastructure may be provided by one or multiple wireless communications systems, such as wireless communications system 110 and wireless communication system 112. One of the wireless communication systems 110, 112 may be a Wi-Fi access point connected with the network 106. Another of the wireless communication systems 110, 112 may be a wireless carrier system that can be implemented using various data processing equipment, communication towers, etc. Alternatively, or in addition, the wireless carrier system may rely on satellite technology to exchange information with the mobile device 104.

The communication infrastructure may also include a communication-enabling system 115 that serves as an intermediary in passing information between the server system 120 and the wireless communication system 110. The communication-enabling system 115 may communicate with the wireless communication system 110 (e.g., a wireless carrier) via a dedicated channel, and may communicate with the server system 120 via a non-dedicated communication mechanism, e.g., a public Wide Area Network (WAN) such as the Internet.

In one embodiment, server system 120 acts as an intermediary between server system 122 and mobile device 104. An application installed on mobile device 104 may initiate a connection with server system 122. While the connection is active, server system 122 may send data in network packets to server system 120, and server system 120 may forward these network packets to mobile device 104. Similarly, the mobile device 104 may send network packets to server system 120, and server system 120 may forward the network packets to server system 122. In alternative network configurations, the mobile device 104 may connect to server system 122 directly, without using server system 120 as an intermediary or proxy.

A network connection to the server system 122 may be maintained even when the mobile device is placed into a low power mode (e.g., a sleep mode or a suspended mode). While the mobile device is in the low power mode, server system 122 may still send network packets to mobile device over the active connection. When the wireless component 138 receives the network packet, the wireless component traditionally would wake-up a processing device of the mobile device and forward the network packet to the processing device. Frequent wake-ups of the mobile device by the network packets may negatively affect battery life of the mobile device.

Applications installed on the mobile device 104 may additionally set wake-up alarms for the mobile device. A wake-up alarm specifies a particular time at which the processing device of the mobile device is to be woken up. Frequent wake-ups of the mobile device 104 by wake-up alarms may also negatively affect the battery life of the mobile device 104.

In one embodiment, mobile device 104 includes a wake-up manager 135 that applies wake-up restriction policies to reduce the frequency that the mobile device 104 is woken up. Wake-up manager 135 may apply network restriction policies, alarm wake-up restriction policies, wake lock restriction policies, and/or other wake-up restriction policies.

A network wake-up restriction policy may restrict network wake-ups by performing transmission control protocol (TCP) resets of connections and/or by applying a network wake-up filter 145. A TCP reset is a command indicating that a connection endpoint should not send any more packets using a current connection (identified by a port number), and that the connection endpoint should discard any further packets it receives with headers indicating they belong to that connection. The TCP reset effectively terminates a network connection (e.g., a TCP connection). Accordingly, by issuing a TCP reset for a connection before the mobile device is suspended, that wake-up manager 135 guarantees that network packets from that network connection will not be able to wake the mobile device 104.

A network wake-up filter 145 prevents packets associated with a particular network connection from waking the mobile device 104 without actually terminating that network connection. In order to implement a network wake-up filter 145, wake-up manager 135 identifies a network connection that is to be filtered, and adds an entry for that network connection to a blacklist of the network wake-up filter 145. The wake-up manager 138 then updates firmware of the wireless component 138 to include the network wake-up filter. When a network packet is received over a particular active network connection while the mobile device 104 is suspended, the wireless component 138 searches the blacklist of the network wake-up filter 145 for that particular active connection (e.g., by searching for a particular port number and/or source identifier in entries of the network wake-up filter 145). If there is an entry for the wireless network connection, then the wireless component 138 drops the packet without waking the processing device of the mobile device 104. When a packet is dropped, the processing device may never be informed of the packet, even after the processing device is activated. Dropping the packet may include failing to write the packet to any cache, ignoring the packet, and/or temporarily writing the packet to a cache but enabling the packet to be overwritten in the cache, for example. An indication that the packet was deliberately dropped may or may not be sent to an original sender of the packet. If no such indication is sent, the original sender of the packet may attempt to resend the packet one or more times. Such resent packets would also be dropped so long as the entry associated with the original sender remains in the network wake-up filter 145. If there is no entry for the wireless network connection, then the wireless component 138 wakes the processing device of the mobile device 104 and forwards the network packet to the processing device.

Wake-up manager 135 may also apply alarm wake-up restrictions to minimize or eliminate wake-up alarms by specified applications. To implement an alarm wake-up restriction, wake-up manager 135 may scan an alarm wake-up schedule 152 before the mobile device 104 enters a suspended state. The wake-up manager 135 may check each of the alarm wake-ups in the alarm wake-up schedule 152 to determine if any of those alarm wake-ups violate the alarm wake-up restriction. Those alarm wake-ups that violate the alarm wake-up restriction are removed. Accordingly, when the mobile device 104 transitions to the suspended state, none of the removed alarm wake-ups will be able to wake-up the mobile device 104.

Figure 2:
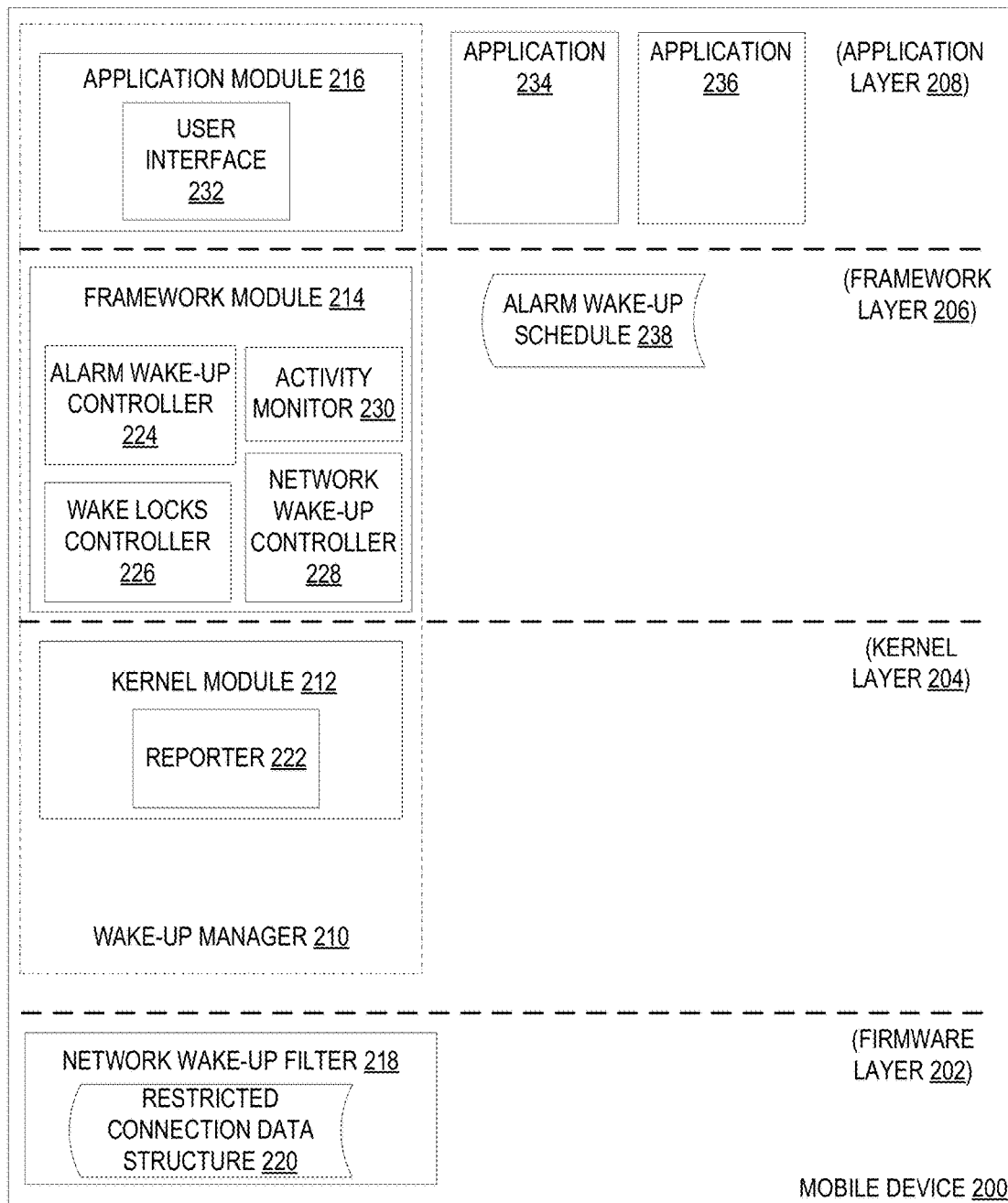
FIG. 2 is a block diagram of a logical view of a mobile device, in accordance with one embodiment.

FIG. 2 is a block diagram of a logical view of a mobile device 200, in accordance with one embodiment. The mobile device 200 is logically divided into a firmware layer 202, a kernel layer 204, a framework layer 206 and an application layer 208. The firmware layer 202 includes data and program code stored in persistent memory of one or more components of the mobile device 200. For example, mobile device 200 includes a wireless component (e.g., a Wi-Fi NIC) that has firmware for controlling the wireless component. In some instances the firmware is programmable. Accordingly, the firmware of the wireless component may be updated to include a wireless wake-up filter 216 before the mobile device 200 is placed into a sleep state or suspended state.

The kernel layer 204 is reserved for privileged processes, and provides access to operations that are not available at the framework layer 206 or application layer 208. The kernel layer 204 also acts as an abstraction layer between hardware and the higher layers (e.g., the framework layer 206 and application layer 208). Examples of processes that execute at the kernel layer 204 include privileged kernel processes, kernel extensions, and most device drivers. The kernel layer 204 may be used, for example, for core functionality such as memory management, process management, networking, and so forth.

The framework layer 206 provides higher-level services to applications. The framework layer 206 includes one or more framework modules that enable system services and applications to interface with lower level libraries. Modules in the framework layer 206 may provide APIs for interfacing with native libraries such as a window manager, media codecs, graphics engines, and so on. Some example framework modules may include an activity manager that manages the activity lifecycle of applications, a resource manager, and so forth.

Most processes operate at the application layer 208. Applications 234, 236 that run at the application layer 208 may include standard applications that are automatically included in the mobile device and additional applications, which may be third party applications and/or other applications that are not pre-installed on the mobile device 200. Examples of applications (or apps) 234, 236 include a social network application (e.g., a Facebook® app, a Google+® app, a LinkedIn® app, etc.), an electronic mail (email) application (e.g., a Yahoo® Mail! app, a Gmail® app, an OS X® mail app, etc.), a calendar application, games, a news-reader application, and so on.

The mobile device 200 includes a wake-up manager 210, which may include components at one or more of the kernel layer 204, framework layer 206 and/or application layer 208. In the illustrated embodiment, the wake-up manager 210 includes a kernel module 212 at the kernel layer 204, a framework module 214 at the framework layer 206 and an application module 216 at the application layer 208.

The kernel module 212 includes a reporter 222. Applications 245, 236 may use modules at the framework layer to perform wake-ups of the mobile device and/or to apply wake locks to the mobile device 200. Activities such as wake-ups and wake locks increase battery drain of the mobile device. Reporter 222 gathers information on all such wake locks and wake-ups that applications perform and reports this information to the framework module 214. Each time the mobile device is brought out of the suspended state (woken-up), the reporter 222 may record the cause of the wake-up. Reporter 222 may record the type of wake-up (e.g., an alarm wake-up or a network wake-up), an application associated with the wake-up, a port associated with the wake-up (if a network wake-up), a source of a packet that caused the wake-up (if a network wake-up), a time of the wake-up, and so on. Reporter 222, may also monitor the amount of time that the mobile device 200 remains in the "awake" state before transitioning back to a suspended state and report this information to the framework module 214. Additionally, reporter 222 may monitor and report the activities performed by an application that caused the wake-up, determine and report resource utilization during the wake-up interval, determine and report battery drain during the wake-up interval, and so on.

Framework module 214 may include an alarm wake-up controller 224, a network wake-up controller 228, a wake lock controller 226 and/or an activity monitor 230. Activity monitor 230 computes statistics on wake-ups and wake locks based on the information received from the reporter 222. Activity monitor 230 may compute average wake-up activity, peak wake-up activity, wake-up activity patterns, and so forth for applications installed on the mobile device (e.g., for applications 234 and 236). Wake-up activity may be separately computed for each type of wake-up (e.g., for network wake-ups and alarm wake-ups). Activity monitor 230 may also compute similar statistics for wake lock activity. In one embodiment, activity monitor 230 determines individual application statistics based on aggregating, for each application, device wake-up events associated with that application to determine a frequency of device wake-up events associated with that application and circumstances under which that application generates device wake-up events. Activity monitor 230 may then compare the individual application statistics to identify which of the applications are responsible for a highest number of device wake-up events.

In addition to computing wake-up activity levels (and wake lock activity levels), activity monitor 230 may also compute power drain, resource usage, average time to next sleep state, etc. associated with the wake-up activity (and wake lock activity). For example, activity monitor 230 may determine that application 234 wakes the mobile device 200 an average of once every 5 minutes, and that the mobile device remains active for about 2 seconds with each wake-up. Activity monitor 230 may additionally determine that application 236 wakes up the mobile device 200 an average of once every 30 minutes, and that the mobile device remains active for about 2 minutes with each wake-up. Activity monitor 230 may also determine importance levels of applications based, for example, on how much a user uses those applications, based on a time of day, based on a day of the week, based on location, based on user input and/or based on other information. For example, applications that a user uses frequently may be assigned a higher importance value than applications that are rarely used by the user. In another example, work related applications (e.g., an email application and a calendar application) may be assigned a higher priority during business hours and a lower priority after business hours. In another example, a navigation application may be assigned a lower importance when a user is at home or work, but a higher importance value when the user is at an unfamiliar location that the mobile device has only visited once or a few times. The importance levels may be one aspect of the computed statistics.

Activity monitor 230 may then assign a rank to each of the applications based on the computed wake-up and/or wake lock statistics, and may order the applications based on their rankings. Applications with the highest rank may be responsible for the most wake-up activity (or the most battery drain caused by wake-up activity). Alternatively, or additionally, the activity monitor 230 may categorize applications into different categories based on the statistics and/or rankings. In one example, activity monitor 230 may categorize applications based on wake-up allowances, and may assign different wake-up restriction policies and/or different wake-up quotas to each of the applications based on the assigned category. For example, highest ranked applications may be grouped into a first category and lowest ranked applications may be ranked into a second category. In another example, applications with a high wake-up allowance may be permitted more wake-ups than applications with a medium wake-up allowance, which may be permitted more wake-ups than applications with a low wake-up allowance. The wake lock controller 226, alarm wake-up controller 224 and/or network wake-up controller 228 may then generate and/or implement wake-up restriction policies (or wake lock restriction policies) based on the wake-up statistics (or wake lock statistics), categorization and/or rankings. Such wake-up restriction policies may or may not include wake-up quotas.

A generated wake-up quota may be applied only to a single application or to multiple applications. For example, a wake-up quota may be part of a wake-up restriction policy that is applied to all applications in a particular category. Alternatively, a wake-up quota may part of a wake-up restriction policy that is applied to all applications. Additionally, a generated wake-up quota may apply to only one type of wake-up or to multiple types of wake-ups and/or to wake locks. For example, a first wake-up quota may apply to alarm wake-ups and a second wake-up quota may apply to network wake-ups. A single wake-up restriction policy may include multiple different wake-up quotas in some instances.

Wake locks may include display wake locks that prevent a display of the mobile device 200 from turning off as well as device wake locks that prevent a processing device of the mobile device from suspending. Wake locks are useful for applications such as games that continually use the processing device and/or display during execution. However, many applications abuse wake locks, unreasonably shortening battery life. Wake lock controller 226 may identify abuses of wake locks based on statistics computed by the activity monitor 230, and may act to mitigate or eliminate such abuses of wake locks. Wake lock controller 226 may set wake lock restrictions that may apply a time limit to how long specific applications are allowed to maintain particular types of wake locks. Wake lock controller 226 may also set wake lock restrictions that prohibit specific applications from using particular types of wake locks and/or from using any wake locks. While a wake lock restriction policy is in place for an application, when the wake-up manager detects an attempt by the application to implement a wake lock, the wake-up manager may determine whether the wake lock violates the wake lock restriction policy. If the wake lock restriction policy would be violated, then the wake-up manager may prevent application of the wake lock. In one embodiment, the wake lock restriction policy includes a wake lock quota that specifies an allowable number of wake locks in a time period and/or an allowable amount of time that wake locks may be held within the time period.

Framework layer 206 includes an alarm wake-up schedule 238. The alarm wake-up schedule 238 indicates all times at which the mobile device 200 will be woken up by a wake-up alarm. Each alarm wake-up entry in the alarm wake-up schedule may identify an application for which wake-up will occur and the time at which the wake-up will occur.

Alarm wake-up controller 224 may generate one or more alarm wake-up restriction policies. Alarm wake-up restriction policies may be generated automatically (without user input) based on the wake-up statistics provided by the activity monitor 230. Alternatively, or additionally, alarm wake-up controller 224 may generate alarm wake-up restriction polices based on user input. In one embodiment, a generated alarm wake-up restriction policy includes an alarm wake-up quota. The alarm wake-up quota may specify an allowable number of alarm wake-ups within a time period. Once an application reaches the alarm wake-up quota, all subsequent alarm wake-ups by that application within the time period may violate the alarm wake-up restriction policy.

In an example, alarm wake-up controller 224 may identify from the alarm wake-up statistics and/or rankings which applications are responsible for the most alarm wake-ups and/or which applications are responsible for the most battery drain from alarm wake-up activity. Alarm wake-up controller 224 may then generate application specific alarm wake-up restriction policies that reduce or prohibit alarm wake-ups by those identified applications. For example, an application specific alarm wake-up restriction policy may limit an application to a specific number of alarm wake-ups in a set period (e.g., 1 wake-up every 5 minutes, 10 wake-ups per hour, 2 wake-ups per minute, etc.).

Alarm wake-up controller 224 may additionally or alternatively generate application agnostic alarm wake-up restrictions that apply equally to all applications. For example, an application agnostic alarm wake-up restriction policy may limit the mobile device 200 to a specific number of alarm wake-ups in a set period (e.g., 5 wake-ups per second, to 1 wake-up per second, to 10 wake-ups per minute, etc.). Alarm wake-up controller 224 may also specify one or a few applications that are exempt from the agnostic alarm wake-up restriction policy. Such applications may have separate application specific wake-up restriction policies or may not have any wake-up restriction policies.

Examples of alarm wake-up schedules are shown in FIGS. 4-6. FIG. 4 illustrates an example unrestricted alarm wake-up schedule 405, while FIGS. 5-6 illustrate example restricted alarm wake-up schedules 505, 605 after different alarm wake-up restriction policies have been applied.

Referring to FIG. 4, the unrestricted alarm wake-up schedule 405 includes alarm wake-up entries for a game, for an email application, for a news application and for a social network application. As shown, the game is scheduled to wake-up the mobile device at 1:00 PM. The email application is scheduled to wake-up the mobile device every 20 minutes (at 1:02 PM, 1:22 PM and 1:42 PM). The social network application is scheduled to wake-up the mobile device every 5 minutes (at 1:05 PM, 1:10 PM, 1:15 PM, 1:20 PM, 1:25 PM, 1:30 PM, 1:35 PM and 1:40 PM). The news application is scheduled to wake-up the mobile device once at 1:16 PM).

Referring to FIG. 5, an application specific alarm wake-up restriction policy limits the social network application and the email application to no more than one alarm wake-up every 30 minutes. The alarm wake-ups scheduled for the social network application at 1:15, 1:20, 1:25, 1:30, and 1:40 violate the alarm wake-up restriction policy, and so are removed from the alarm wake-up schedule. The alarm wake-up scheduled for the email application at 1:22 violates the alarm wake-up restriction policy, and so is also removed from the alarm wake-up schedule.

Referring to FIG. 6, an example application agnostic alarm wake-up restriction policy limits the mobile device to no more than one alarm wake-up every 10 minutes. In the illustrated example the alarm wake-up restriction policy also moves some violating alarm wake-ups to a next allowed wake-up time. In particular, the application agnostic alarm wake-up restriction policy moves a scheduled alarm wake-up to a next permitted time slot if that alarm wake-up satisfies one or more rescheduling rules. In one example, an alarm wake-up is rescheduled to a next allowable time slot if there is no other alarm wakeup that has a higher priority for rescheduling. Priority may be determined based on importance of the application, the last alarm wake-up scheduled for the application, and/or other criteria.

In the illustrated example restricted alarm wake-up schedule 605, the alarm wake-up for the email application is rescheduled to 1:10. The 1:05 alarm wake-up for the social network application is rescheduled to 1:20 and the 1:15 alarm wake-up for the social network application is removed from the schedule. The 1:16 alarm wake-up for the news application is rescheduled to 1:30. The 1:20 alarm wakeup for the social network application is canceled. The 1:22 alarm wake-up for the email application is rescheduled to 1:40. The 1:25 alarm wake-up for the social network application is rescheduled to 1:50, and the 1:30, 1:35 and 1:40 alarm wake-ups are canceled. Finally, the 1:42 alarm wake-up for the email application is rescheduled to 2:00.

In some instances, the alarm wake-up controller 224 may modify an entry in the alarm wake-up schedule from a "real time clock (RTC)—wake-up" setting to an "RTC—no wake-up" setting, or equivalent. An entry in the alarm wake-up schedule with the RTC—wake-up setting will cause the mobile device 200 to be woken up at a specified time. However, an entry in the alarm wake-up schedule with the RTC—no wake-up setting will not cause the mobile device 200 to be woken. Instead, such an entry will cause an associated application to be invoked or notified when a next wake-up after the time indicated in the entry occurs. Accordingly, by converting entries in the alarm wake-up schedule to the RTC—no wake-up setting, those applications will be able to perform their operations on a next wake-up.

In one embodiment, the alarm wake-up controller 224 predicts an amount of power and/or other resources that will be consumed by an application for its operations associated with an entry in the alarm wake-up schedule. Applications that are predicted to consume more than a threshold level of resources may have their entries removed from the alarm wake-up schedule rather than switching those entries to the RTC—no wake-up setting. Applications that are predicted to consume less than the threshold amount of resources may be switched to the RTC—no wake-up setting.

Referring back to FIG. 2, network wake-up controller 228 may generate one or more network wake-up restriction policies. Network wake-ups based on wirelessly received network packets may be referred to as wireless wakeups, and network restriction policies that address network-based wake-ups due to packets received wirelessly may be referred to as wireless restriction policies. Network wake-up restriction policies may be generated automatically (without user input) based on the wake-up statistics provided by the activity monitor 230. Alternatively, or additionally, network wake-up controller 228 may generate alarm wake-up restriction polices based on user input. In one embodiment, a generated network wake-up restriction policy includes a network wake-up quota. The network wake-up quota may specify an allowable number of network wake-ups within a time period. Once an application reaches the network wake-up quota, all subsequent network wake-ups by that application within the time period may violate the network wake-up restriction policy.

Network wake-up controller 228 may apply multiple different types of network wake-up restrictions. In one embodiment, network wake-up controller 228 applies TCP resets in some instances and applies a network wake-up filter 218 in other instances. As discussed previously, TCP resets terminate a connection associated with an application, while a network wake-up filter 218 prevents a network connection from causing the mobile device to wake-up without terminating the network connection.

The determination of whether to apply a TCP reset or a network wake-up filter 218 to prevent an application from causing network wake-ups may be based on user input and/or wake-up restriction policy generation rules. Wake-up restriction policy generation rules may provide criteria for when and how to restrict network wake-ups. For example, applications may be assigned priorities (e.g., high priority, medium priority and low priority). In one embodiment high priority applications are not restricted, while medium and low priority applications may be restricted from causing network wake-ups. In one embodiment, the network wake-up filter 218 is used to restrict network wake-ups for medium priority applications, while TCP resets are used to restrict network wake-ups for low priority applications. In another embodiment, the determination of whether to restrict network wake-ups by a TCP reset or a network wake-up filter is based on the wake-up activity statistics and/or rankings provided by the activity monitor 230. For example, the 10 applications that make the most extensive use of network wake-ups may be restricted by use of the network wake-up filter, while one or more remaining applications whose network wake-up activity exceeds a threshold may be restricted by using TCP resets. Alternatively, TCP resets may be applied to the connections of the applications that make the most extensive use of network wake-ups, while the connections of one or more other applications may be added to the network wake-up filter 218.

If a particular connection is to be filtered out by the network wake-up filter 218, network wake-up controller 228 in some instances may send a notification to a server associated with the open connection. The notification may indicate to the server that future network packets will be filtered until further notice. Alternatively, the notification may instruct the server to push out network packets only at specified times and/or to perform batch pushes of network packets. Some servers may then change their behavior to wait for further notice before sending out network packets, to push out network packets at the specified times and/or to send out batches of network packets.

The network wake-up filter 218 includes a restricted connection data structure 220 (also referred to as a blacklist). Each entry in the restricted connection data structure 220 identifies a connection whose packets are to be filtered by the network wake-up filter 218. Each entry may include a port number and/or one or more source identifiers that can be used to identify the connection and/or a server at another end of the connection. The source identifiers may include an address (e.g., a universal resource locator (URL), an internet protocol (IP) address, etc.), a source name (e.g., Facebook, Twitter, Gmail, etc.) and/or a unique identifier that may be assigned to the connection by the mobile device or a remote server. After the network wake-up controller 228 generates the restricted connection data structure 220, it updates the network wake-up filter 218 in the network component's firmware to include the restricted connection data structure 220. Network wake-up controller 228 may update the restricted connection data structure 220 of the network wake-up filter 218 each time the mobile device 200 is to be placed into a sleep or suspended state.

Referring to FIG. 7, an example restricted connection data structure 705 for use in a network wake-up filter is shown. In the illustrated example restricted connection data structure 705, each entry includes a port number and a restricted source name. When a network packet is received by the wireless component, the network wake-up filter searches through the entries in the restricted connection data structure 705 to determine if the network packet is associated with a restricted connection (e.g., is associated with a restricted source). In one embodiment, the network wake-up filter determines information about a connection and/or source associated with the network packet from a header of the network packet. If, for example, the network packet was received on port 1024 from the social network server, then a match would be found to the first entry in the restricted connection data structure 705. Responsive to identifying the match, the wireless component would drop the network packet without waking the mobile device. In some instances the network component may inform the source of the network packet that the packet was dropped. In other instances no such notice is sent. If the received network packet did not have a port number and/or source that matched any of the entries, then the network component would issue an interrupt to the processing device of the mobile device to wake the processing device. The network component would then forward the network packet to the processing device.

Referring back to FIG. 2, Application module 216 of the wake-up manager 210 may include a user interface 232. The user interface 216 may be a graphical user interface (GUI) or command line user interface. User interface 232 may display wake-up statistics and/or application rankings generated by the activity monitor 230. For example, user interface 232 may provide to a user a ranking of applications that cause the most network wake-ups, a ranking of applications that cause the most alarm wake-ups, and/or an overall ranking of applications based on all wake-ups caused by the applications. User interface 232 may also display power consumption associated with the wake-ups of the applications, and may rank the applications based on the power consumption. Other statistics about the applications may also be shown.

The user interface 216 may also enable a user to easily select applications to apply wake-up restrictions to and to set up wake-up restriction policies to apply to those applications. For example, user interface 232 may enable a user to set a network wake-up restriction policy, a wake lock restriction policy and/or an alarm wake-up restriction policy for an application or a group of applications by a click of a button or tap of a screen or touchpad.

The user interface 216 may provide multiple levels of control for specifying wake-up restriction policies. A user that wants fine grain control of wake-up restriction policies may specify periods at which the wake-up restriction policy will be applied, the applications to which it will be applied, as well as specific rules for implanting the wake-up restriction policies. For example, the user may manually set an alarm wake-up restriction policy for an application to restrict that application to 1 alarm wake-up every minute from 6:00 AM to 5:00 PM and to disallow alarm wake-ups for that application from 5:00 PM to 6:00 AM.

A user may want coarse grain control of wake-up restriction policies. Accordingly, the user interface 232 may provide a user with multiple different power saving modes. Each power saving mode may be associated with a different set of wake-up restriction policies and/or wake lock restriction polices. These policies may be automatically generated by the wake-up manager 210, or may be generated based on user input.

Three example power saving modes that a user may select include a normal mode, a power concern mode and a power saver mode. The normal mode does not impose any wake-up restriction policies on applications. The power concern mode enables conservative wake-up restriction policies and/or applies wake-up restriction policies to a limited number of applications to extend battery life. Some examples of conservative wake-up restriction policies include a network wake-up restriction policy that implements a network wake-up filter but no TCP resets, and an alarm wake-up restriction policy that reduces alarm wake-ups by 30% for a few applications. These wake-up restriction policies may apply to those applications that consume the most power and/or that are responsible for the highest number of device wake-ups. A user may select which applications to apply wake-up restriction policies to when the power concern mode is enabled, or may let the wake-up manager automatically select these applications.

The power save mode may enable aggressive wake-up restriction policies and/or wake-up restriction policies that apply to all applications. Power save mode may maximize battery life, but may sacrifice performance to a small degree. As with the power concern mode, these wake-up restriction policies may be set by a user or may be automatically set by the wake-up manager 210.

While the mobile device 200 is in the power save mode, wake-up manager 210 may treat wake-ups as resources. Each application may be granted a specific wake-up budget. When an application's wake-up budget in a time period is exceeded, that application may be prevented from causing additional wake-ups until a time period resets. For example, each application may be permitted to wake-up the mobile device 200 five times every 20 minutes. Once an application has woken the device five times in a twenty minute period, all alarm wake-ups of the application in that 20 minute period may be removed from the alarm wake-up schedule. Additionally, a TCP reset may be applied to a network connection associated with the application or the network connection of the application may be added to a network wake-up filter until a new 20 minute period starts.

Figure 3:
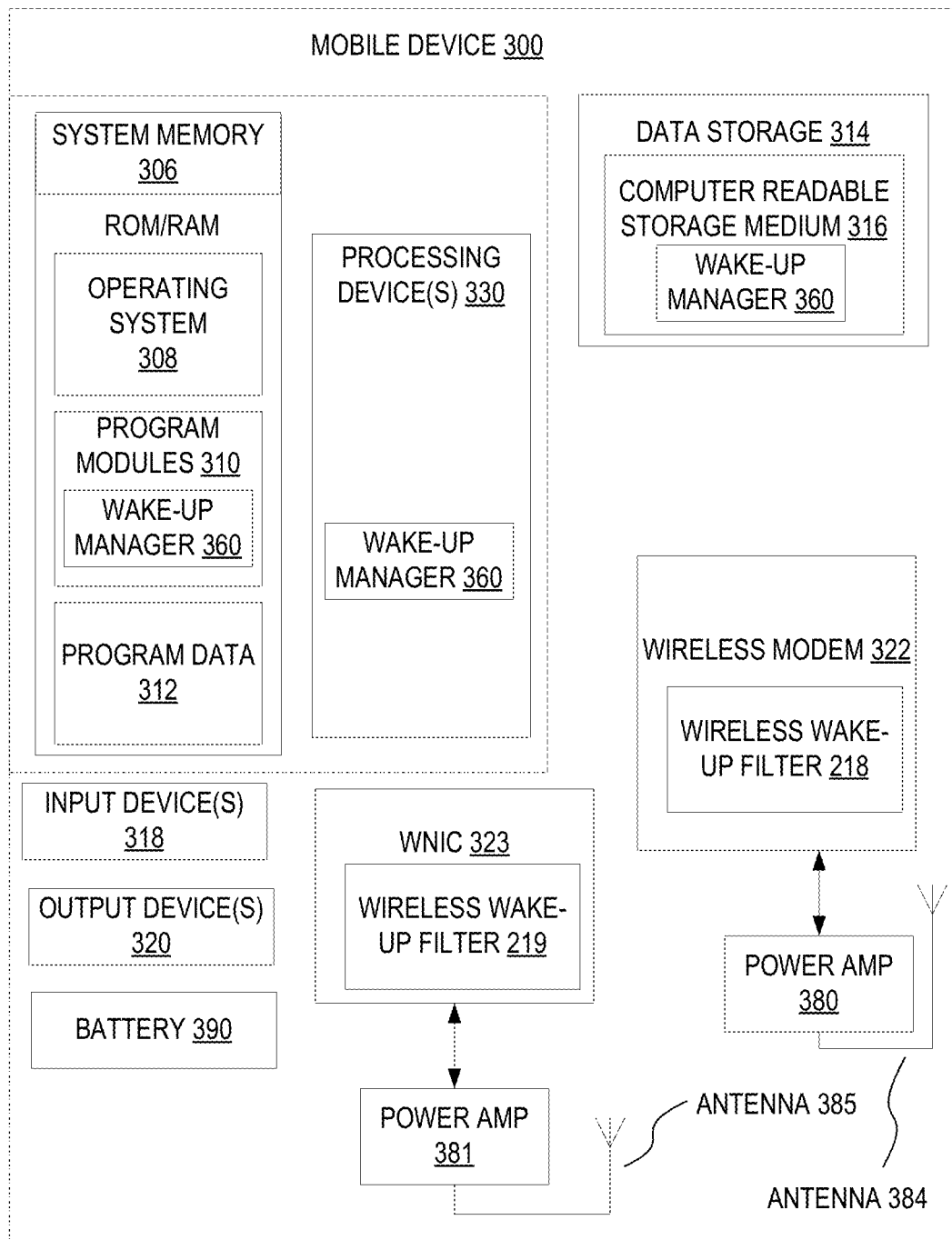
FIG. 3 is a block diagram illustrating an example mobile device with a wake-up manager, in accordance with one embodiment.

FIG. 3 is a block diagram illustrating an example mobile device 300 that includes a wake-up manager 360. The mobile device 300 may correspond to the mobile device 104 of FIG. 1 and may be any type of mobile computing device such as an electronic book reader, a PDA, a mobile phone, a laptop computer, a portable media player, a tablet computer, a camera, a video camera, a netbook, a computing pad, and the like.

The mobile device 300 includes one or more processing devices 330. Each processing device may be a general purpose processing device (e.g., a microprocessor, central processing unit, or the like) or a special purpose processing device (e.g., an application specific integrated circuit (ASIC), a field programmable gate array (FPGA), a digital signal processor (DSP), network processor, or the like). The mobile device 300 also includes system memory 306, which may correspond to any combination of volatile and/or non-volatile storage mechanisms. The system memory 306 stores information which provides an operating system component 308, various program modules 310 such as for a wake-up manager 360, program data 312, and/or other components. The mobile device 300 performs functions by using the processor(s) 330 to execute instructions provided by the system memory 306.

The mobile device 300 also includes a data storage device 314 that may be composed of one or more types of removable storage and/or one or more types of non-removable storage. The data storage device 314 includes a computer-readable storage medium 316 on which is stored one or more sets of instructions embodying any one or more of the methodologies or functions described herein. As shown, instructions for the wake-up manager 360 may reside, completely or at least partially, within the computer readable storage medium 316, system memory 306 and/or within the processing device(s) 330 during execution thereof by the mobile device 300, the system memory 306 and the processing device(s) 330 also constituting computer-readable media. The mobile device 300 may also include one or more input devices 318 (keyboard, mouse device, specialized selection keys, touchpad, touch screen, etc.) and one or more output devices 320 (displays, printers, audio output mechanisms, etc.).

Mobile device 300 may also include a battery 390 that provides a finite amount of power. The battery 390 may provide a consistent voltage and/or amperage to components of the mobile device 200 until the battery reaches a drained state at which the battery 390 can no longer provide the voltage and/or amperage. When the battery 390 reaches this state, the mobile device may be suspended and/or turned off.

The mobile device 300 may further include a wireless modem 322 to allow the mobile device 300 to communicate via a wireless network (e.g., such as provided by the wireless communication systems) with other computing devices, such as remote computers, the server systems, and so forth. The wireless modem 322 may allow the mobile device 300 to handle both voice and/or non-voice communications (such as communications for text messages, multimedia messages, media downloads, web browsing, etc.) with the wireless communication system 110. The wireless modem 322 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1×RTT), evaluation data optimized (EVDO), high-speed down-link packet access (HSDPA), long term evolution (LTE), worldwide interoperability for microwave access (WIMAX), etc. In one embodiment, the wireless modem includes a wireless wake-up filter 218 that may be programmed into a firmware of the wireless modem 322 by the wake-up manager 360. The wireless wake-up filter may alternatively be implemented as hardware and/or software of the wireless modem 322.

The wireless modem 322 may generate signals and send these signals to power amplifier (amp) 380 for amplification, after which they are wirelessly transmitted via antenna 384. In addition to sending data, antenna 384 may also receive data (e.g., network packets), which is sent to wireless modem 322. Wireless modem 322 may then apply the wireless wake-up filter 218 and then potentially wake the processing device(s) 330 and/or transfer the network packet to the processing device(s) 330.

The mobile device 300 may further include a wireless network interface controller (WNIC) 323 to allow the mobile device 300 to communicate via a wireless network (e.g., such as provided by the wireless communication systems) with other computing devices, such as remote computers, the server systems, and so forth. The WNIC 323 may be a Wi-Fi NIC, a Bluetooth NIC, a Zigbee NIC, or other wireless NIC. In one embodiment, the WNIC 232 includes a wireless wake-up filter 219 that may be programmed into a firmware of the WNIC 323 by the wake-up manager 360. The wireless wake-up filter 219 may alternatively be implemented as hardware and/or software of the WNIC 323.

The WNIC 323 may generate signals and send these signals to power amplifier (amp) 381 for amplification, after which they are wirelessly transmitted via antenna 385. In addition to sending data, antenna 385 may also receive data (e.g., network packets), which is sent to WNIC 323. WNIC 323 may then apply the wireless wake-up filter 219 and then potentially wake the processing device(s) 330 and/or transfer the network packet to the processing device(s) 330.

In one embodiment, the wireless modem 322, the WNIC 323 and the processing device(s) 330 are each discreet devices (e.g., each discreet integrated circuits). Alternatively, one or more of the wireless modem 322, WNIC 323 and processing devices 330 may be logics of a single integrated circuit.

FIGS. 8-12 are flow diagrams of various embodiments of methods related to implementing wake-up and wake lock restrictions to minimize power consumption of a mobile device. The methods are performed by processing logic that may include hardware (circuitry, dedicated logic, etc.), software (such as is run on a general purpose computer system or a dedicated machine), firmware, or some combination thereof. In one implementation, the methods may be performed a mobile device, which may correspond to mobile device 104 of FIG. 1, mobile device 200 of FIG. 2 and/or mobile device 300 of FIG. 3.

For simplicity of explanation, the methods are depicted and described as a series of acts. However, acts in accordance with this disclosure can occur in various orders and/or concurrently, and with other acts not presented and described herein. Furthermore, not all illustrated acts may be performed to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Figure 8:
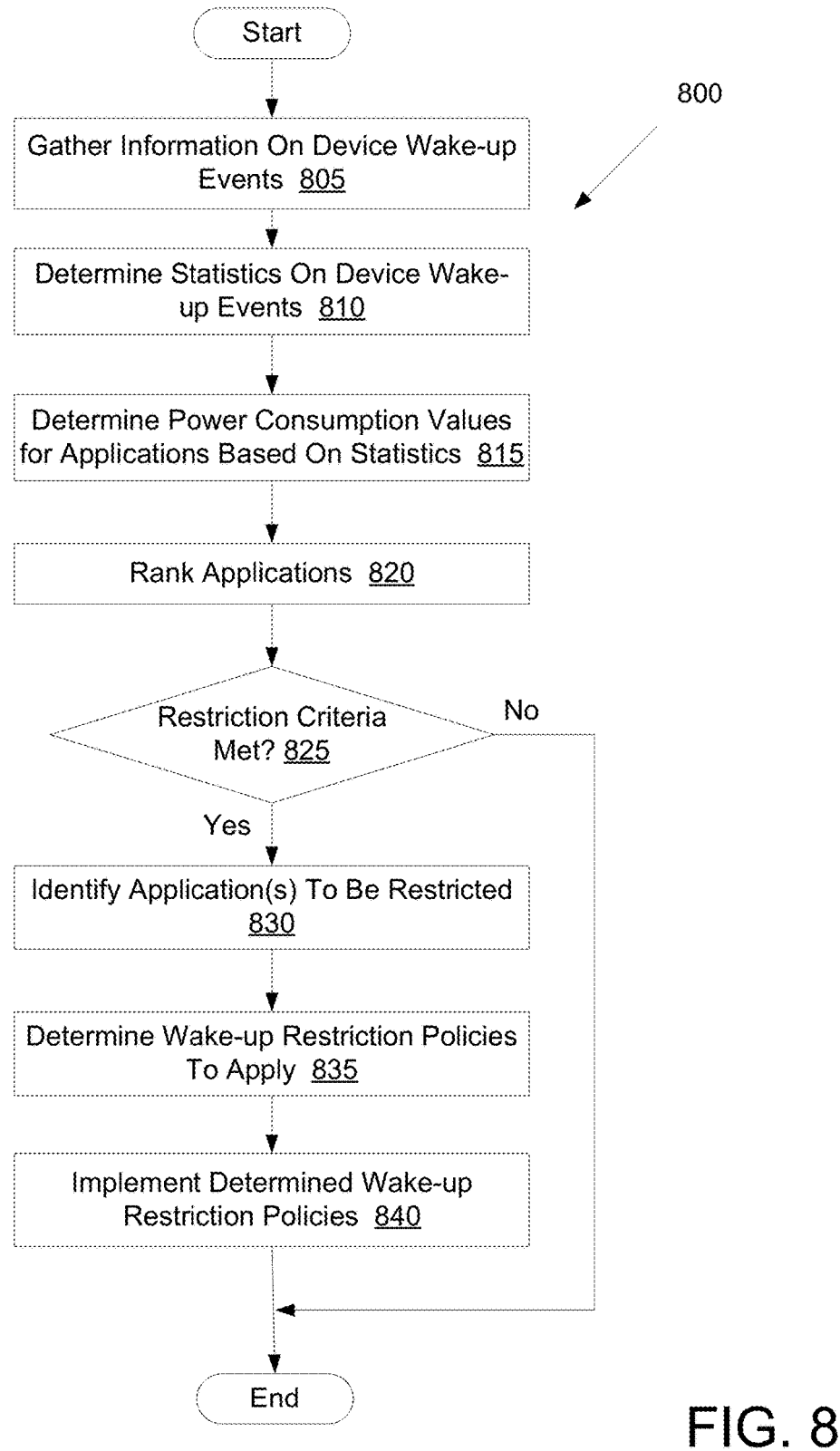
FIG. 8 is a flow diagram of an embodiment for a method of implementing wake-up restriction policies by a mobile device.

FIG. 8 is a flow diagram of an embodiment for a method 800 of implementing wake-up restriction policies and wake lock restriction policies by a mobile device. At block 805 of method 800, processing logic gathers information on device wake-up events and wake lock events. This may include information identifying the type of wake-up event (e.g., a network wakeup such as a Wi-Fi wakeup, an alarm wakeup, etc.), an application associated with the wake-up event, a time of the wake-up event, a duration of the wake-up event, a duration of a wake lock, a type of wake lock (e.g., a display wake lock or a processing device wake lock), etc.

At block 810, processing logic determines statistics on the wake-up events and/or the wake lock events based on the gathered information. At block 815, processing logic determines power consumption values for the applications based on the statistics. Power consumption values may also be considered as part of the determined statistics. In one embodiment, at block 820 processing logic ranks the applications based on the statistics and/or power consumption values. One or multiple rankings may be applied to applications. For example, a first ranking of Wi-Fi wake-ups, a second ranking of alarm wake-ups, and a third ranking of wake locks may be applied to an application. Alternatively, or additionally, a single overall ranking may be applied to an application. Alternatively, no ranking may be performed.

At block 825, processing logic determines whether any restriction criteria are met by the applications based on the rankings and/or the statistics. Different restriction criteria may be applied by the processing logic for different power saving modes. For example, no restriction criteria may be used to set wake-up restrictions or wake lock restrictions if the mobile device is in a normal mode of operation. A first set of restriction criteria may be applied to generate and/or apply wake-up restrictions and/or wake lock restrictions if the mobile device is in a power concern mode, and a second set of restriction criteria may be applied to generate and/or apply wake-up restrictions and/or wake lock restrictions if the mobile device is in a power save mode. If any restriction criteria are met, the method proceeds to block 830. Otherwise the method may end.

In one embodiment, a user interface provides a user with an option to set wake-up restriction criteria and/or to manually set wake-up restriction policies. In such an embodiment, block 825 may be skipped, and the method may proceed from block 820 to block 830.

At block 830, processing logic identifies one or more applications to be restricted. These may include applications whose wake-up statistics and/or rankings have caused the applications to meet the restriction criteria. These may also include applications that have been selected by a user for wake-up restrictions.

At block 835, processing logic determines one or more wake-up restriction policies to apply to the selected application or applications. In one embodiment, the wake-up restriction policies are generated by processing logic and then applied to the applications. The wake-up restriction policies may be generated based on the restriction criteria in one embodiment. Alternatively, or additionally, one or more wake-up restriction policies may be configured by a user. Wake-up restriction policies may include alarm wake-up restriction policies and network wake-up restriction policies (e.g., Wi-Fi wakeup restriction policies for preventing Wi-Fi wakeups). Additionally, wake lock restriction policies may be determined for applications. At block 840, the determined wake-up restriction policies and/or wake lock restriction policies are applied to the applications. The method then ends.

Figure 9:
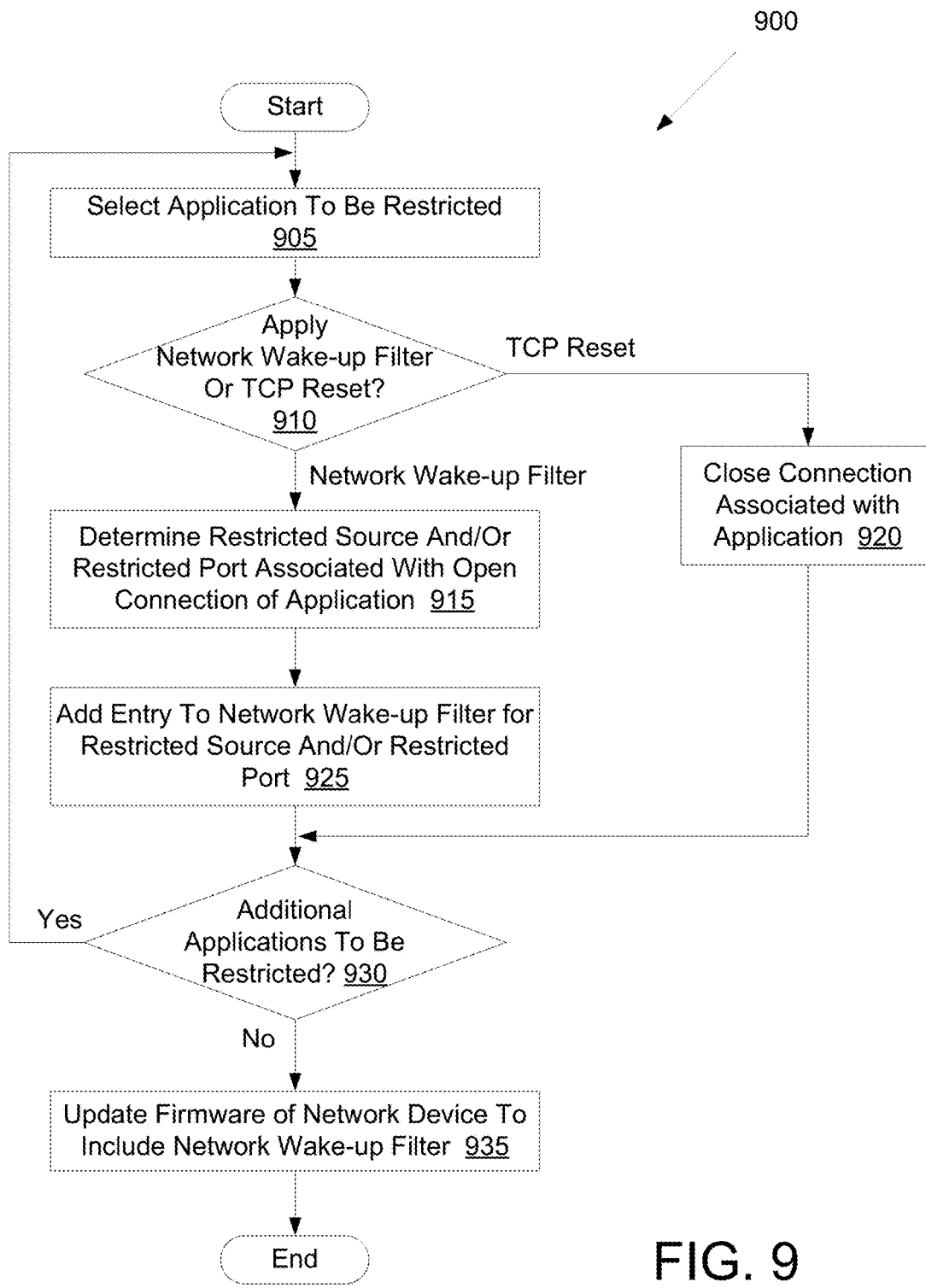
FIG. 9 is a flow diagram of an embodiment for a method of implementing a network wake-up restriction policy.

FIG. 9 is a flow diagram of an embodiment for a method 900 of implementing a network wake-up restriction policy (e.g., a Wi-Fi wake-up restriction policy). At block 905 of method 900, processing logic selects an application to be restricted. The selection may be made automatically based on one or more restriction criteria or by a user.

At block 905, processing logic determines whether to apply a network wake-up filter or a TCP reset to restrict network wake-ups of the selected application. If a TCP reset is to be implemented, the method continues to block 920 and a network connection associated with the application is closed. If a network wake-up filter is to be applied, the method continues to block 915.

At block 915, processing logic determines a restricted source and/or a restricted port associated with the open connection of the application. At block 925, processing logic adds an entry to a network wake-up filter for the restricted source and/or restricted port. For example, processing logic may add an entry to a blacklist of the network wake-up filter that identifies open connections for which network packets are to be filtered and dropped.

At block 930, processing logic determines whether there are any additional applications for which network wake-up restrictions are to be applied. If so, the method returns to block 905. Otherwise, the method continues to block 935. At block 935, processing logic updates a firmware of a network device (also referred to as a network component) to include the network wake-up filter (and the blacklist). The method then ends.

Figure 10:
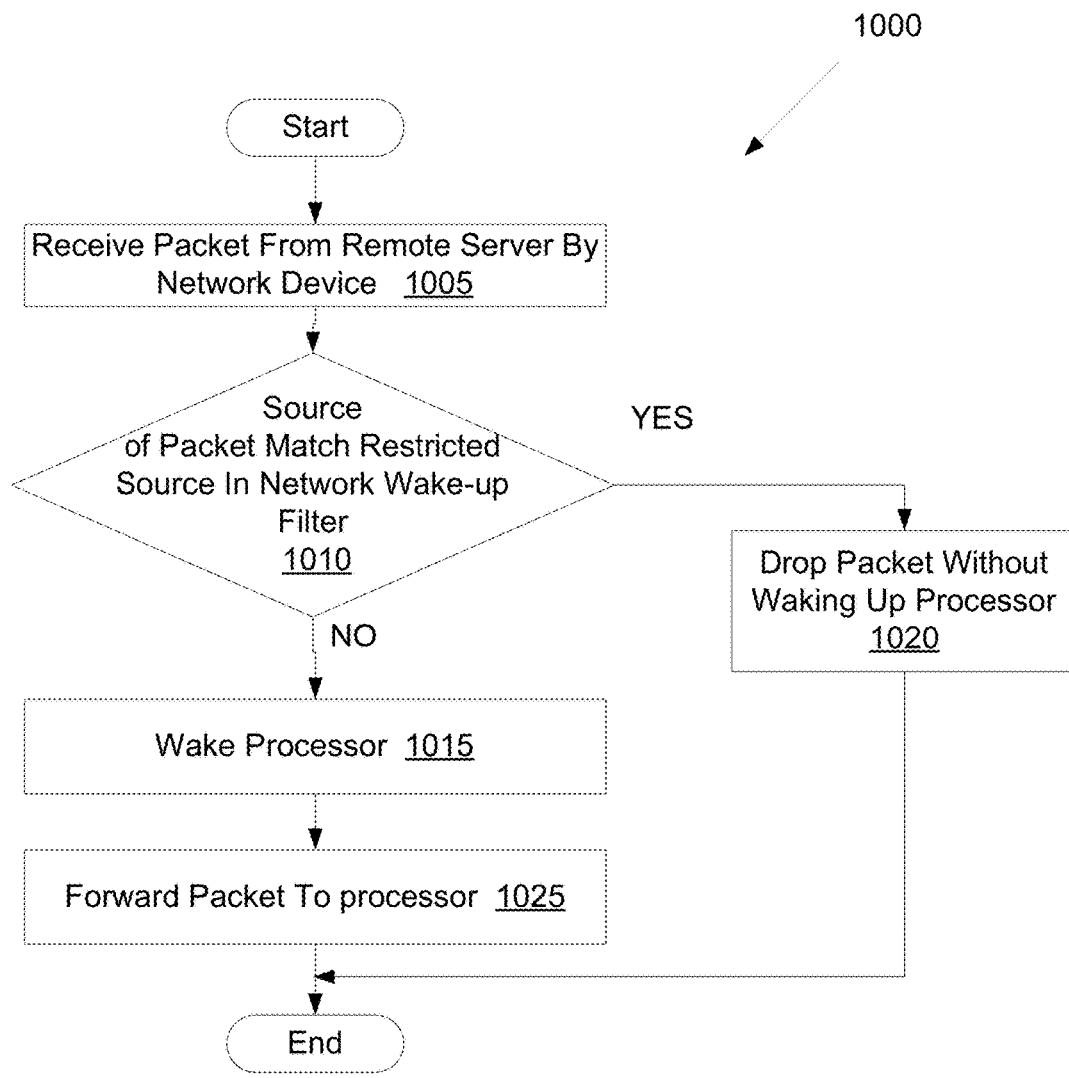
FIG. 10 is a flow diagram of an embodiment for a method of applying a network wake-up restriction policy.

FIG. 10 is a flow diagram of an embodiment for a method 1000 of applying a network wake-up restriction policy. Method 1000 may be performed by a network device such as a WNIC or a wireless modem that includes a network wake-up filter. At block 1005 of method 1000 a network device receives a packet from a remote server. At block 1010, processing logic of the network device determines whether a source of the network packet matches a restricted source in a blacklist of a network wake-up filter. This determination may be made, for example, by extracting a port number and/or source identifier from a header of the network packet, and comparing the port number and/or source identifier to entries in the blacklist of the network wake-up filter. If the source matches a restricted source, the method continues to block 1020, and the network packet is dropped without waking up a processing device. If the source does not match any restricted source, the method continues to block 1015. At block 1015, processing logic wakes the processing device. At block 1025, processing logic then forwards the network packet to the processing device.

Figure 11:
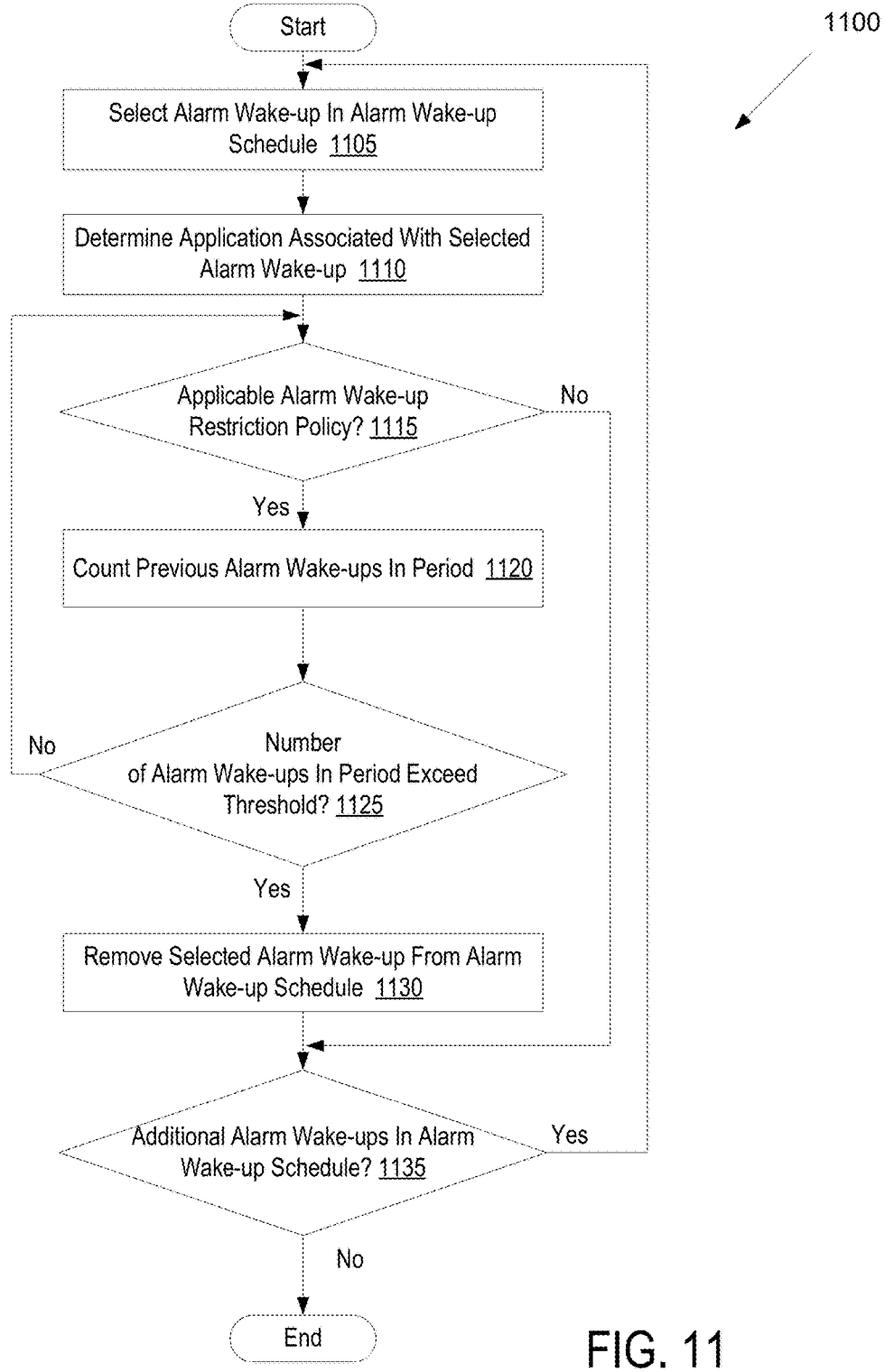
FIG. 11 is a flow diagram of an embodiment for a method of applying one or more alarm wake-up restriction policies.

FIG. 11 is a flow diagram of an embodiment for a method 1100 of applying one or more alarm wake-up restriction policies. At block 1105 of method 1100, processing logic selects an alarm wake-up in an alarm wake-up schedule. At block 1110, processing logic determines an application associated with the selected alarm wake-up. At block 1115, processing logic determines whether there is an alarm wake-up restriction policy that is applicable to the application. In some instances, multiple different alarm wake-up restriction policies may be applicable to the application. For example, one or both of an application agnostic alarm wake-up restriction policy and an application specific wake-up restriction policy may apply to an application. If at least one alarm wake-up restriction policy is applicable to the application, then the method continues to block 1120. Otherwise, the method proceeds to block 1135.

At block 1120, processing logic counts a number of previous alarm wake-ups in a period. If the alarm wake-up policy is application agnostic (applies to all applications except potentially to those that are explicitly excluded), then the number of previous alarm wake-ups by all applications in the period are counted. If the alarm wake-up policy is specific to the application, then the number of previous alarm wake-ups in the period made by that application are counted. In some embodiments, processing logic may also count a number of network wake-ups that have been made by the application in the period for an application specific alarm wake-up policy or count a number of previous network wake-ups that have been made by any application in the period for an application agnostic alarm wake-up policy.

At block 1125, processing logic determines whether the number of alarm wake-ups (and/or other wake-ups) in the period exceeds the threshold. If so, the alarm wake-up fails to conform to the alarm wake-up restriction policy, and the method proceeds to block 1130. If the number of alarm wake-ups in the period does not exceed the threshold, then the alarm wake-up conforms to the alarm wake-up restriction policy and the method returns to block 1115 and processing logic checks if there are any other alarm wake-up policies that are applicable to the application.

At block 1130, processing logic removes the selected alarm wake-up from the alarm wake-up schedule. At block 1135, processing logic determines if there are any other alarm wake-up entries in the alarm wake-up schedule. If so, the method returns to block 1105, and a next alarm wake-up entry in the alarm wake-up schedule may be selected. This process may continue and repeat until all alarm wake-ups in the alarm wake-up schedule (or within a certain period) have been examined. If there are no remaining alarm wake-ups to check at block 1135, then the method ends.

Figure 12:
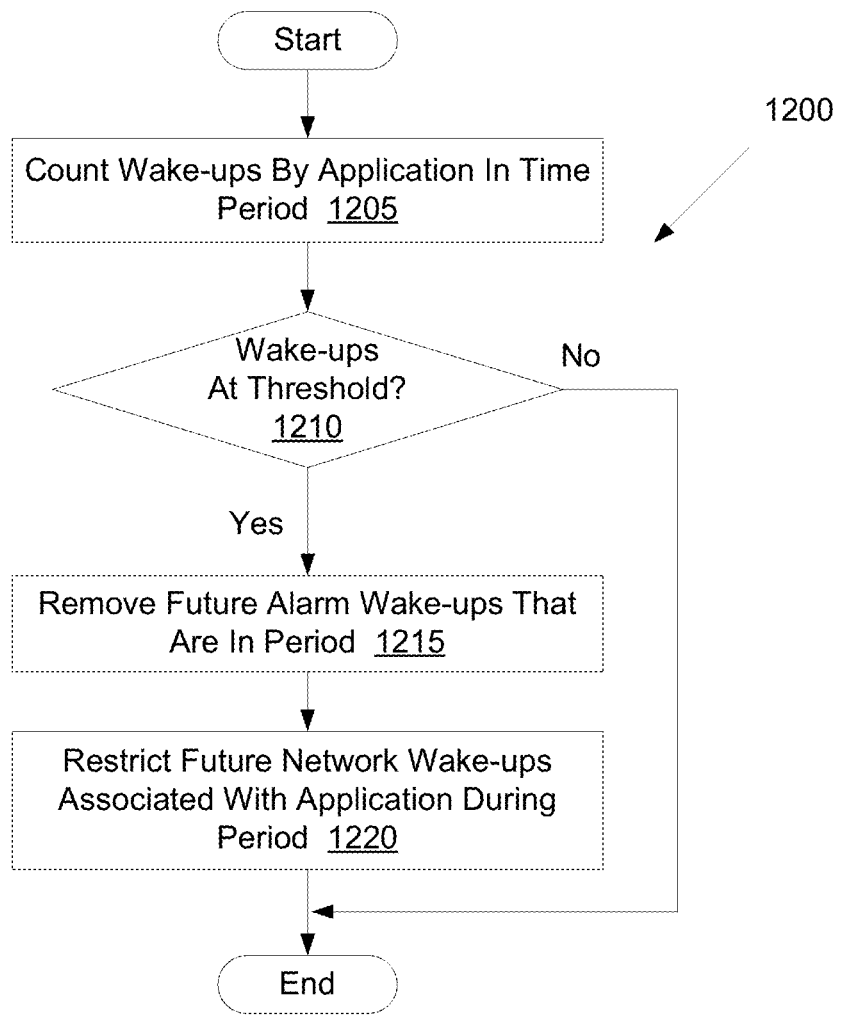
FIG. 12 is a flow diagram of an embodiment for a method of managing wake-up events as a resource.

FIG. 12 is a flow diagram of an embodiment for a method 1200 of managing wake-up events as a resource. Method 1200 may be performed to apply a wake-up quota, which may be a generic wake-up quota that applies to all types of wake-ups or may be a wake-up quota that is specific to a particular type of wake-ups (e.g., to network wake-ups or to alarm wake-ups). The wake-up quota may be part of a wake-up restriction policy.

At block 1205 of method 1200, processing logic counts a number of wake-ups for an application that have occurred within a time period. In one embodiment, the counted wake-ups include alarm wake-ups as well as network wake-ups. Alternatively, the counted wake-ups may include only alarm wake-ups or only network wake-ups.

Wake-ups may be treated as a battery draining resource, and may be budgeted to applications via an assigned wake-up quota. Some applications may have high wake-up budgets (e.g., 10 wake-ups per minute), while other applications may have lower wake-up budgets (e.g., 1 wake-up every hour). A wake-up budget may be automatically assigned to an application (e.g., based on generated statistics about one or more applications, an assigned category of the application, a ranking of the application, etc.) or may be set by a user. At block 1210, processing logic determines whether the number of wake-ups meets or exceeds a wake-up threshold that has been allotted to the application. If the total number of wake-ups meets or exceeds the wake-up threshold, the method continues to block 1215. Otherwise the method ends.

In one embodiment, at block 1215 processing logic removes one or more future alarm wake-ups for the application from an alarm wake-up schedule. The future alarm wake-ups may be removed if the wake-up quota is an alarm wake-up quota or if the wake-up quota applies to multiple types of wake-ups (including alarm wake-ups).

In one embodiment, at block 1220, if the application has an open network connection, then processing logic implement one or more operations of a network wake-up restriction policy. The network wake-up restriction policy may either perform a TCP reset of the open network connection or implement a network wake-up filter to prevent network packets associated with the open connection from waking the mobile device. The network wake-up restriction policy operations may be implemented if the wake-up quota is a network wake-up quota or if the wake-up quota applies to multiple types of wake-ups (including network wake-ups). Processing logic may also initiate one or more wake lock restrictions for the application. The method then ends.

In some embodiments, processing logic may apply multiple different wake-ups thresholds. For example, processing logic may apply a first threshold that limits an application to 10 wake-ups per hour, and may apply a secondary threshold that limits the application to no more than 3 wake-ups in a 10 minute period. The secondary threshold that has the shorter period may be referred to as a velocity reducing rule. By applying the secondary threshold (the velocity reducing rule), processing logic may force the application to slow down its use of wake-ups. This may prevent the application from using up all of its budgeted wake-ups during the first portion of an applicable period.

In one embodiment, if the application exceeds the secondary threshold, then processing logic throttles down the rate at which the application is permitted to perform wake-ups by adding one or more additional temporary thresholds or restrictions. These additional temporary thresholds may be dynamic thresholds. For example, if the application exceeds the secondary threshold, then processing logic may prohibit the application from performing any additional wake-ups for a temporary period (e.g., for 10 minutes), or may initiate a temporary threshold (e.g., that limits the application to 1 wake-up in a temporary period). Once the temporary period elapses, processing logic may lift the temporary restriction (e.g., the dynamic threshold) or may adjust the dynamic threshold (e.g., by changing from 1 wake-up per 10 minute period to 2 wake-ups per 10 minute period). This enables processing logic to ration out wake-ups in a controlled manner.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "gathering", "determining", "identifying", "implementing", "receiving" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Some portions of the detailed description are presented in terms of methods. These methods may be performed by processing logic that may comprise hardware (circuitry, dedicated logic, etc.), software (such as is run on a general purpose computer system or a dedicated machine), or a combination of both. In certain embodiments, the methods are performed by a mobile device, such as mobile device 104 of FIG. 1. Some methods may be performed by a wake-up manager (e.g., wake-up manager 135) of a mobile device.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of non-transitory media suitable for storing electronic instructions (e.g., media other than a carrier wave).

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A mobile device comprising:
a processing device to:
determine a first subset of a plurality of applications;
determine a second subset of the plurality of applications;
perform a transmission control protocol (TCP) reset for each application of the first subset; and
add an entry for each application in the second subset to a list comprising applications to be restricted by a network wake-up filter, wherein an entry for a first application in the second subset comprises a source identifier associated with the first application; and
a network component that includes the network wake-up filter and is operatively coupled to the processing device, the network component to:
receive a packet from a remote server;
identify a source of the packet;
determine that the source identifier in the list matches the source; and
drop the packet.

2. The mobile device of claim 1, wherein the network component is further to:
receive a second packet from a second remote server;
identify a second source of the second packet;
determine that the second source does not match any source identifier in the list;
activate the processing device; and
forward the second packet to the processing device.

3. The mobile device of claim 1, wherein the processing device is further to:
determine statistics about a plurality of network wake-up events associated with the plurality of applications; and
identify the second subset of the plurality of applications as applications that are associated with a highest number of network wake-up events based on the statistics.

4. The mobile device of claim 1, wherein the network component comprises a wireless component.

5. The mobile device of claim 1, wherein dropping the packet enables the packet to be deleted without the processing device being informed of the packet.

6. The mobile device of claim 1, wherein the network component comprises a wireless network interface controller (WNIC), and wherein the processing device and the WNIC are logics of a single integrated circuit.

7. The mobile device of claim 1, wherein the processing device is further to update firmware of the network component to include the network wake-up filter comprising the list.

8. A method comprising:
gathering, by a processing device, information about device wake-up events associated with a plurality of applications, wherein the device wake-up events comprise Wi-Fi wake-up events that activate the processing device responsive to receipt of packets over Wi-Fi;
determining, by the processing device, statistics about the device wake-up events associated with the plurality of applications;
identifying a first subset of the plurality of applications that are associated with at least a first percentage of the device wake-up events;
performing a transmission control protocol (TCP) reset for each application of the first subset;
identifying a second subset of the plurality of applications that are associated with at least a second percentage of the device wake-up events;
applying a wake-up restriction policy by adding an entry for each application in the second subset to a list comprising applications to be restricted by a network wake-up filter, wherein an entry for a first application in the second subset comprises a source identifier associated with the first application;

receiving a packet from a remote server by a Wi-Fi component that includes the network wake-up filter;

identifying a source of the packet;

determining that the source identifier in the list matches the source; and dropping the packet by the Wi-Fi component without waking the processing device, wherein dropping the packet enables the packet to be deleted without the processing device being informed of the packet.

9. The method of claim 8, wherein the device wake-up events further comprise alarm wake-up events that are to activate the processing device at specified times, wherein the wake-up restriction policy comprises an alarm wake-up threshold specifying an allowable number of alarm wake-ups in a time period, the method further comprising:

determining that an alarm wake-up fails to conform to the wake-up restriction policy by determining that the alarm wake-up causes a number of alarm wake-ups in the time period to exceed the alarm wake-up threshold; and removing the alarm wake-up from an alarm wake-up schedule.

10. The method of claim 8, further comprising:

detecting an attempt by the first application to implement a wake lock to prevent at least one of the processing device from suspending or a display from turning off; and responsive to determining that the wake lock violates the wake-up restriction policy, preventing application of the wake lock.

11. The method of claim 8, wherein determining the statistics comprises:

determining individual application statistics based on aggregating, for each application, device wake-up events associated with that application to determine a frequency of device wake-up events associated with that application and circumstances under which that application generates device wake-up events; and comparing the individual application statistics to identify which of the applications are associated with a highest number of device wake-up events.

12. A computer readable storage medium having instructions that, when executed by a processing device, cause the processing device to perform operations comprising:

determining a first subset of a plurality of applications;

determining a second subset of the plurality of applications;

performing a transmission control protocol (TCP) reset for each application of the first subset;

adding an entry for each application in the second subset to a list comprising applications to be restricted by a network wake-up filter, wherein an entry for a first application in the second subset comprises a source identifier associated with the first application;

receiving a packet from a remote server by a network component that comprises the network wake-up filter; identifying a source of the packet;

determining that the source identifier in the list matches the source; and preventing the wake-up from activating the processing device by dropping the packet.

13. The computer readable storage medium of claim 12, the operations further comprising:

gathering information about a plurality of previous wake-up events associated with one or more of the plurality of applications;

determining statistics about the plurality of previous wake-up events; and creating a wake-up restriction policy based on the statistics.

14. The computer readable storage medium of claim 13, wherein the wake-up restriction policy comprises an application specific alarm wake-up restriction policy that comprises a time period and an alarm wake-up threshold specifying an allowable number of alarm wake-ups in the time period, and wherein applying the application specific alarm wake-up restriction policy comprises:

identifying a new alarm wake-up associated with the first application;

counting a number of previous alarm wake-ups associated with the first application that are within the time period;

determining that the number of previous alarm wake-ups associated with the first application is at or above the alarm wake-up threshold; and preventing the new alarm wake-up from activating the processing device.

15. The computer readable storage medium of claim 13, wherein the wake-up restriction policy comprises an application specific alarm wake-up restriction policy that comprises a time period and an alarm wake-up threshold specifying an allowable number of alarm wake-ups in the time period, and wherein applying the application specific alarm wake-up restriction policy comprises:

identifying a new alarm wake-up associated with the first application;

counting a number of previous alarm wake-ups associated with the first application that are within the time period;

determining that the number of previous alarm wake-ups associated with the first application is below the alarm wake-up threshold; and permitting the new alarm wake-up to activate the processing device.

16. The computer readable storage medium of claim 13, wherein the wake-up restriction policy comprises an application agnostic alarm wake-up restriction policy that comprises a time period and an alarm wake-up threshold indicating an allowable number of alarm wake-ups in the time period, and wherein applying the application agnostic alarm wake-up restriction policy comprises:

identifying a new alarm wake-up associated with any application;

counting a number of previous alarm wake-ups within the time period;

determining that the number of previous alarm wake-ups within the time period is at or above the alarm wake-up threshold; and preventing the new alarm wake-up from activating the processing device.

17. The computer readable storage medium of claim 16, wherein preventing the new alarm wake-up from activating the processing device comprises removing the new alarm wake-up from an alarm wake-up schedule by the processing device before the processing device is suspended.

* * * * *